May 10, 1938.  A. L. KLAWITTER  2,117,096
FLUID CONTROL DEVICE
Filed Sept. 28, 1936
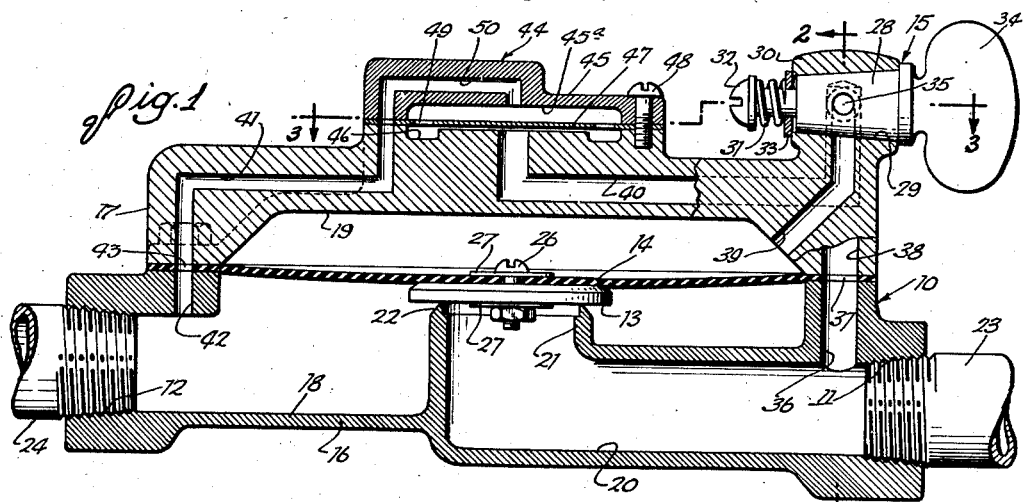
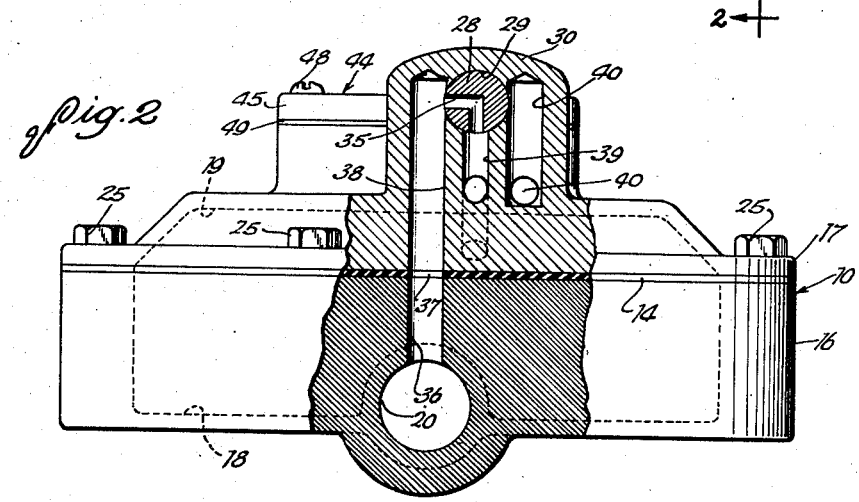
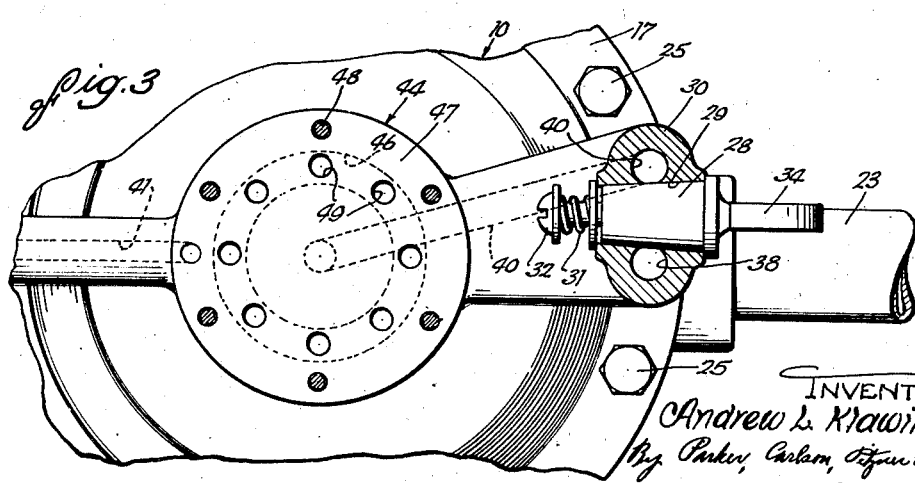
INVENTOR
Andrew L. Klawitter
By Parker, Carlson, Pfau & Hubbard
ATTORNEYS Patented May 10, 1938

2,117,096

UNITED STATES PATENT OFFICE 2,117,096

FLUID CONTROL DEVICE

Andrew L. Klawitter, Chicago, Ill.

Application September 28, 1936, Serial No. 102,895

2 Claims. (Cl. 137—139)

The invention relates to fluid control devices and more particularly to pressure actuated devices especially adapted to control the flow of combustible gases and the like.

One object of the invention is to provide an improved pressure actuated fluid control device of such character that the pressure of the fluid passing therethrough may be utilized in a simple and effective manner to actuate the same, the device being rugged in construction and economical to manufacture.

Another object of the invention is to provide an improved pressure actuated fluid control device of such character that the fluid passing therethrough may be utilized to exert a selectively varied differential actuating pressure thereon without the necessity of providing special bleeder connections or the like as has heretofore been the practice.

Further objects and advantages of the invention will become apparent as the following description proceeds and the features of novelty which characterize the invention are pointed out with particularity in the claims annexed to and forming a part of this specification.

For a better understanding of the invention reference may be had to the accompanying drawing in which Figure 1 is a transverse sectional view of a fluid control device embodying the invention.

Fig. 2 is an end elevation partly in section along the line 2—2 of the device shown in Fig. 1.

Fig. 3 is a partial plan view of the device shown in Fig. 1, a portion of the device being sectioned along the line 3—3.

For purposes of illustration the invention has been shown as embodied in a device particularly adapted for controlling the flow of combustible gas or similar fluids to a space heater or other consumption device. In general, the fluid control device comprises a casing 10 having an inlet 11 and outlet 12 the flow of fluid between the inlet and outlet being controlled by a pressure responsive valve element illustrated in the form of a valve disk 13 carried by a flexible diaphragm 14. The valve disk 13 is movable to open and closed position upon the application of fluid pressure to opposite sides of the diaphragm 14, the weight of the valve disk normally serving to maintain the same in closed position. The lower side of the valve disk 13 is exposed to the inlet pressure, which tends to move the same to open position while a valve means designated generally by the numeral 15 is selectively operable to subject the upper side of the diaphragm 14 to inlet pressure thus closing the valve disk or alternatively to direct fluid away from the upper side of the diaphragm to the outlet thereby permitting opening movement of the valve disk.

In the particular construction illustrated the casing 10 includes a main body member 16 and a cover member 17. Both of the members 16 and 17 are generally cylindrical in shape and are provided with complementary recesses 18 and 19 respectively in the adjacent faces thereof, which cooperate to define an interiorly located chamber within the casing. The casing member 16 is cored out to form a passage 20 communicating with the inlet 11 and terminating in an upwardly extending circular opening 21 surrounded by a sharp edged valve seat 22 on which the valve disk 13 rests. A supply pipe or conduit 23 is threaded in the inlet opening 11 and a similar discharge pipe or conduit 24 is threaded in the outlet opening 12.

The edge portion of the flexible diaphragm 14 is clamped between the opposed faces of the casing members 16 and 17, the casing members being held in position by cap screws 25. The valve disk 13 is secured to the center of the diaphragm 14 by a bolt 26 having suitable washers 27 interposed between the adjacent surfaces of the diaphragm and valve disk. Sufficient flexibility is had in the diaphragm 14 to permit the disk 13 to move into closed position on the valve seat 22 and alternatively to open position in which the valve disk is spaced upwardly away from the valve seat to permit the flow of fluid from the inlet 11 through the passage 20 and opening 21 into the chamber 18 and thence to the outlet 12.

The valve means 15 serves in general to subject the upper side of the diaphragm 14 to inlet pressure in order to close the same or alternatively to direct fluid from the upper side of the diaphragm to the outlet thereby permitting opening of the valve element 13 under the pressure exerted thereon by the fluid entering through the passage 20. The valve means 15 may be either manually operable or automatically operable by a suitable thermostatic control device or the like. For the sake of simplicity a manually controlled valve means has been illustrated. Thus, in the particular construction shown a two-way valve is provided which includes a tapered valve body 28 journaled in the bore 29 formed in an upstanding projection 30 on the upper casing member 17. A compression spring 31 surrounding an adjusting screw 32 on the end of the valve body 28 and bearing against a washer 33 serves to maintain the valve body 28 firmly in position in the bore 29. A thumb grip 34 is provided on the end of the valve body 28. Upon reference to Fig. 2 it will be seen that an L-shaped passage 35 is formed in the valve body 28 and as is hereinafter described in greater detail, this passage serves to effect two alternative fluid connections for the recess 19 on the upper side of the diaphragm 14 in the two rotative positions of the valve body 28.

When in the position shown in Fig. 2 the passage 35 in the valve body 28 serves to complete a fluid communication between the inlet 11 and the upper side of the diaphragm 14. This fluid communication is had through a by-pass conduit formed by a bore 36 in the lower casing member 16, an aperture 37 in the diaphragm 14, and a bore 38 formed in the upper casing member 17. Fluid thus passes from the inlet 11 through the communicating bores 36 and 38, the passage 35 in the valve body 28, and then to the recess 19 on the upper side of the diaphragm 14 through a passage 39 in the upper casing member 17. It will be noted that the portion of the upper side of the diaphragm 14 which is exposed to fluid pressure in the chamber 19 is of much greater area than is the lower face of valve disk 13 which is subjected to inlet pressure in the passage 20. Consequently, when the inlet pressure is applied to the entire upper surface of the diaphragm 14 upon turning the two-way valve to the position shown in Fig. 2, the valve disk 13 will be held in its closed position due to the differential in total pressure after having been closed by its own weight.

When the valve body 28 of the two-way valve is rotated ninety degrees in a counterclockwise direction, as viewed in Fig. 2, it serves to establish communication between the upper side of the diaphragm 14 and the outlet 12. This communication is had through a second by-pass conduit formed by a passage 40 in the upper casing member 17 terminating at one end in the bore 29 and at the other end in the center of the upper side of the casing member. A second passage 41 formed in the upper casing member 17 communicating with a passage 42 in the lower casing member 16 and a registering aperture 43 in the diaphragm 14 also constitute part of the second by-pass conduit.

The return flow of fluid from the outlet 12 to the upper side of the diaphragm 14 through the second by-pass conduit is prevented by a check valve designated generally by the numeral 44. This check valve includes a disk-shaped casing member 45 having a recess 45a in the lower face thereof overlying the upper end of the passage 40 as well as an annular recess 46 formed in the upper surface of the casing member 17. A flexible disk-shaped valve element 47 is clamped between the members 44 and 17 by screws 48, the valve element being provided with a series of apertures 49 (Fig. 3) located above the annular recess 46. A passage 50 is also formed in the member 45 communicating at its opposite ends with the recess 45a and passage 41.

In the operation of the fluid control device described above, the valve body 28 of the two-way valve is rotated to the position shown in Fig. 2 in order to close the main valve disk 13. In such case pressure fluid from the inlet 11 passes through the bores 26 and 28, passage 35, and passage 39 to the upper side of the diaphragm 14. As was previously noted, the inlet pressure is thereupon applied to the entire upper surface of the diaphragm 14 thus overbalancing the pressure applied to the lower surface of the valve disk 13 and closing the latter.

In order to open the valve disk 13 the two-way valve body 28 is rotated ninety degrees in a counterclockwise direction as viewed in Fig. 2, thereby cutting off the flow of pressure fluid from the inlet 11 to the upper side of the diaphragm 14 and at the same time permitting fluid to flow from the recess or chamber 19 on the upper side of the diaphragm to the outlet 12. Thus, fluid is permitted to flow from the chamber 19 through passage 39, passage 35, and valve body 28, and through the passage 40. The pressure of the fluid in the passage 40 is applied to the lower surface of the check valve element 47 lifting the same so that the fluid may flow through the recesses 46 and 45a and then through passages 50, 41, and 42 to the outlet 12. The pressure on the upper side of the diaphragm 14 is thus relieved so that the valve disk 13 is moved to its open position by the inlet fluid pressure applied thereto through the passage 20. At the same time, the check valve 44 prevents the return flow of fluid from the outlet 12 to the upper side of the diaphragm. When the valve disk 13 is in its open position, fluid is free to flow from the inlet 11 through passage 20, opening 21, and chamber 18 to the outlet 12.

Although a particular embodiment of the invention has been shown and described for purposes of illustration, there is no intention to thereby limit the invention to such particular embodiment but on the other hand, the appended claims are intended to cover all modifications within the spirit and scope of the invention.

I claim as my invention:

1. A device for controlling the flow of combustible gas or the like from a pressure source to a restricted outlet such as a gas burner device comprising, in combination, a valve casing having an inlet and an outlet, means including a main valve element and a movable actuating diaphragm therefor in said casing for controlling the flow of gas between said inlet and outlet, one side of said diaphragm being exposed to the pressure of the gas in said inlet for moving said diaphragm to open position, means operable at will for by-passing gas from said inlet to the other side of said diaphragm to move the same to closed position and for alternatively establishing a passage from said other side of said diaphragm to said outlet to relieve the pressure thereon and thereby permit opening of said main valve element, and means including a check valve in said passage operable to permit only a unidirectional flow of gas to said outlet through said by-pass for preventing the fluttering of said main element to minimize the pressure drop in the gas flowing past the same.

2. A device for controlling the flow of combustible gas or the like from a pressure source to a restricted outlet such as a gas burner device comprising, in combination, a valve casing having an inlet and an outlet, means including a main valve element and a movable actuating diaphragm therefor in said casing for controlling the flow of gas between said inlet and outlet, one side of said diaphragm being exposed to the pressure of the gas in said inlet for moving said diaphragm to open position, said casing defining a chamber communicating with the other side of said diaphragm, means defining passages communicating with said inlet and outlet, means including a two-way valve for alternatively opening one of said passages and closing the other to establish communication through the said first passage from said inlet to said chamber for exerting a closing pressure on said diaphragm and alternatively to establish communication through said second passage from said chamber to said outlet to relieve the pressure on said diaphragm and permit opening thereof, and means including a check valve in said second passage operable to permit only a unidirectional flow of gas to said outlet from said chamber for preventing the fluttering of said main valve element to minimize the pressure drop in the gas flowing past the same.

ANDREW L. KLAWITTER.